US011653602B2

(12) United States Patent
Davico

(10) Patent No.: US 11,653,602 B2
(45) Date of Patent: May 23, 2023

(54) ADJUSTABLE SHADE HOUSE DRIVEN BY PULLEYS

(71) Applicant: OMBREA, Aix-en-Provence (FR)

(72) Inventor: Christian Davico, Rousset (FR)

(73) Assignee: OMBREA, Aix-en-Provence (FR)

( * ) Notice: Subject to any disclaimer, the term of this patent is extended or adjusted under 35 U.S.C. 154(b) by 220 days.

(21) Appl. No.: 17/252,134

(22) PCT Filed: Jun. 14, 2019

(86) PCT No.: PCT/EP2019/065727
§ 371 (c)(1),
(2) Date: Dec. 14, 2020

(87) PCT Pub. No.: WO2019/238942
PCT Pub. Date: Dec. 19, 2019

(65) Prior Publication Data
US 2021/0251156 A1 Aug. 19, 2021

(30) Foreign Application Priority Data
Jun. 15, 2018 (FR) ...................................... 18 55277

(51) Int. Cl.
*H02S 20/30* (2014.01)
*A01G 13/02* (2006.01)
(Continued)

(52) U.S. Cl.
CPC .......... *A01G 13/0206* (2013.01); *H02S 20/23* (2014.12); *H02S 20/30* (2014.12); *E04F 10/10* (2013.01)

(58) Field of Classification Search
CPC ....... H01L 31/00–078; Y02E 10/50–60; H02S 20/00–32; H02S 30/00–20; A01G 13/0206
(Continued)

(56) References Cited

U.S. PATENT DOCUMENTS 3,911,621 A * 10/1975 McHeffey ............... E05C 9/066
70/141
2009/0250094 A1 10/2009 Robison et al.
(Continued)

FOREIGN PATENT DOCUMENTS

EP 2 507 564 10/2012
FR 3 019 883 10/2015
(Continued)

OTHER PUBLICATIONS

KR200477536 with machine English translation (Year: 2004).*
(Continued)

*Primary Examiner* — Bach T Dinh
(74) *Attorney, Agent, or Firm* — Nixon & Vanderhye

(57) ABSTRACT

Shade house for casting an adjustable shadow over a surface, the shade house including: at least one frame extending in a longitudinal direction; a first set of photovoltaic panels mounted on the frame substantially orthogonally to a same orientation axis; a second set of opaque panels, for preference photovoltaic, mounted on the frame and movable in longitudinal translation relative to the frame at least between an open configuration, in which the panels are at least partially superposed over the panels in a view along the orientation axis, and a closed configuration, in which the panels at least partially extend beyond the panels in a view along the orientation axis; and an actuation system configured to actuate the second set at least from the open configuration to the closed configuration, and vice versa, the actuation system including pulleys mounted on the frame.

20 Claims, 5 Drawing Sheets

(51) Int. Cl.
*H02S 20/23* (2014.01)
*E04F 10/10* (2006.01)

(58) Field of Classification Search
USPC .................................................. 136/243–265
See application file for complete search history.

(56) References Cited

U.S. PATENT DOCUMENTS

| | | | |
|---|---|---|---|
| 2013/0111814 A1* | 5/2013 | Drohan | G02B 26/02 |
| | | | 49/82.1 |
| 2013/0305634 A1 | 11/2013 | Dondurur et al. | |
| 2018/0195766 A1* | 7/2018 | Cheun | H02S 30/20 |

FOREIGN PATENT DOCUMENTS

| | | |
|---|---|---|
| JP | 2016-67272 | 5/2016 |
| WO | 2011/066913 | 6/2011 |
| WO | 2015/085442 | 6/2015 |

OTHER PUBLICATIONS

Search Report for FR Application No. 1855277 dated Feb. 14, 2019, 2 pages.
International Search Report for PCT/EP2019/065727 dated Jul. 3, 2019, 6 pages.
Written Opinion of the ISA for PCT/EP2019/065727 dated Jul. 3, 2019, 7 pages.

* cited by examiner

ADJUSTABLE SHADE HOUSE DRIVEN BY PULLEYS

This application is the U.S. national phase of International Application No. PCT/EP2019/065727 filed Jun. 14, 2019 which designated the U.S. and claims priority to FR Patent Application No. 18 55277 filed Jun. 15, 2018, the entire contents of each of which are hereby incorporated by reference.

BACKGROUND OF THE INVENTION

Field of the Invention

The present invention relates to a shading device adapted to form an adjustable shadow on a surface, in particular a planted surface.

The invention also relates to a method for forming and adjusting such a shadow.

Description of the Related Art

A shade house is a device for providing shade, generally comprising a clerestory surface and supports. Such a device is described in particular in document JP-A-2016067272. As shown in FIG. 1 of this document, the shade house consists of regularly spaced photovoltaic panels. Each tiltable panel is mounted on a pole.

Such a shade house requires a large number of poles and panel actuation systems. In addition, it allows the shadow formed to be adjusted only over a relatively limited variation range.

SUMMARY OF THE INVENTION

One object of the invention is to reduce all or part of the above disadvantages, i.e. in particular to provide a simpler shading device while allowing the production of electricity.

To this end, the invention relates to a shade house adapted to form an adjustable shadow on a surface, in particular a planted surface, the shade house comprising:
  at least one frame extending in a longitudinal direction,
  a first set of photovoltaic panels mounted on the frame substantially orthogonal to the same orientation axis, fixed relative to each other, and distributed successively along the longitudinal direction,
  a second set of opaque panels, for preference photovoltaic, mounted on the frame substantially orthogonal to the orientation axis, fixed to each other, and distributed successively along the longitudinal direction, the second set being movable in translation longitudinally relative to the frame at least between an open configuration of the shade house, wherein the panels of the second set are at least partially, and for preference totally, superposed on the panels of the first set when viewed along the orientation axis, and a closed configuration of the shade house wherein the panels of the second set protrude at least partially, and for preference totally, from the panels of the first set when viewed along the orientation axis,
  optionally, a third set of opaque panels, for preference photovoltaic, mounted on the frame substantially orthogonal to the orientation axis, fixed to each other, and distributed successively along the longitudinal direction, the third set being movable in translation longitudinally relative to the frame at least between the open configuration, wherein the panels of the third set are at least partially, and for preference totally, superposed on the panels of the first set when viewed along the orientation axis, and the closed configuration, wherein the panels of the third set protrude at least partially, and for preference totally, from the panels of the first set and the panels of the second set when viewed along the orientation axis, and
  an actuation system configured to actuate the second set, and optionally the third set, at least from the open configuration to the closed configuration, and vice versa, the actuation system comprising a plurality of pulleys mounted on the frame.

According to particular embodiments, the shade house comprises one or more of the following features, taken alone or in any technically possible combination:
  the panels of the second set are fixed to each other by at least two cables, and, optionally, the panels of the third set are fixed to each other by the cables;
  each of the two cables respectively form a closed loop, each of the loops being stretched between two of the pulleys respectively;
  the actuation system further comprises: at least one shaft rotatably mounted on the frame, and at least one motor configured to drive the shaft, two of the pulleys being attached to the shaft;
  the panels of the first assembly are fixed relative to the frame;
  in the closed configuration, the panels are substantially adjacent to each other when viewed along the orientation axis;
  the panels have a same extension in the longitudinal direction;
  the panels of the first set are evenly distributed in the longitudinal direction, two successive panels of the first set being separated longitudinally by a same gap; the panels of the second set are evenly distributed in the longitudinal direction, two successive panels of the second set being separated longitudinally by said gap; and optionally the panels of the third set are evenly distributed in the longitudinal direction, two successive panels of the third set being longitudinally separated by said gap, said gap being substantially equal to twice said extension if the shade house has the optional third set, or substantially equal to said extension if the shade house does not have the optional third set;
  the frame comprises two opposing stringers in a transverse direction perpendicular to the longitudinal direction; and the panels of the second set and optionally the panels of the third set extend transversely between the stringers and are supported by the stringers;
  the stringers define grooves for guiding the panels; and the panels of the second set and optionally the panels of the third set have rollers adapted to roll in said grooves; and
  the chassis comprises at least one support, and a movable part including the two stringers, the movable part being rotatable relative to the support about a pivot axis substantially parallel to the longitudinal direction between at least two distinct positions.

The invention also relates to a method for forming and adjusting a shadow on a surface, comprising the following steps:
  providing a shade house as described above,
  actuation of the second set to move the second set longitudinally in translation relative to the frame at least between the open and closed configuration of the shade house, or vice versa, optionally actuation of the third set to move the third set longitudinally relative to the frame at least between the open and closed configuration of the shade house, or vice versa, and production of electricity by at least some of the panels, and recovery of the electricity produced.

BRIEF DESCRIPTION OF THE DRAWINGS

The invention will be better understood by reading the following description, given only as an example, and made with reference to the attached drawings, on which.

SUMMARY OF THE INVENTION

Figure 1:
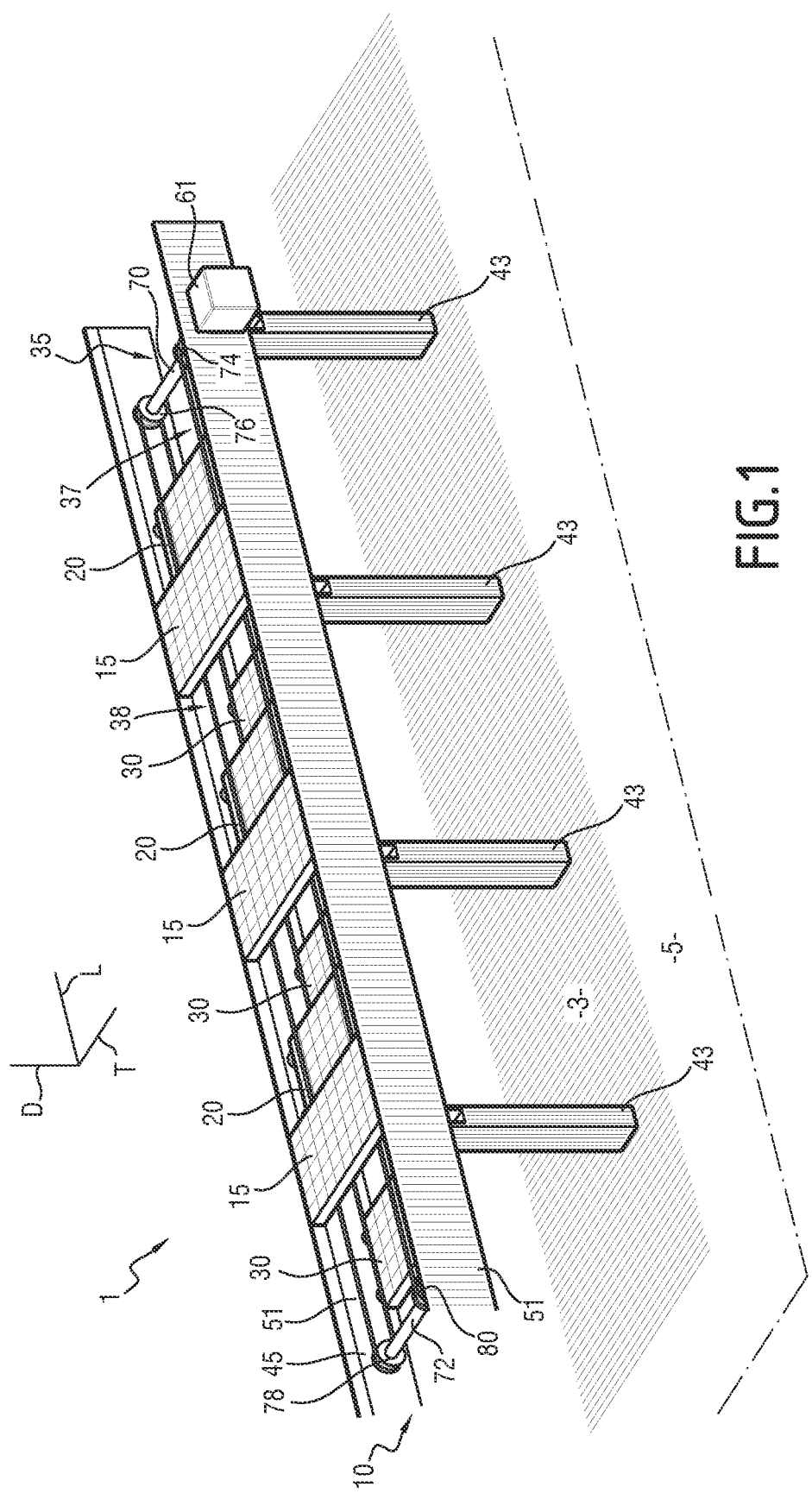
FIG. 1 is a partial schematic perspective view of a shade house according to the invention, the shade house being in a closed configuration.

With reference to FIGS. 1 to 4, a shade house 1 is described according to the invention. The shade house 1 is adapted to form a shadow 3 on a surface 5 such as onto the ground, advantageously comprising crops or plantations (not shown).

The shade house 1 comprises a frame 10 extending in a longitudinal direction L, for example substantially parallel to the ground 5, a first set of panels 15 mounted on the frame 10 substantially orthogonal to the same orientation axis D orthogonal to the longitudinal direction L, a second set of photovoltaic panels 20, and a third set of photovoltaic panels 30.

Figure 2:
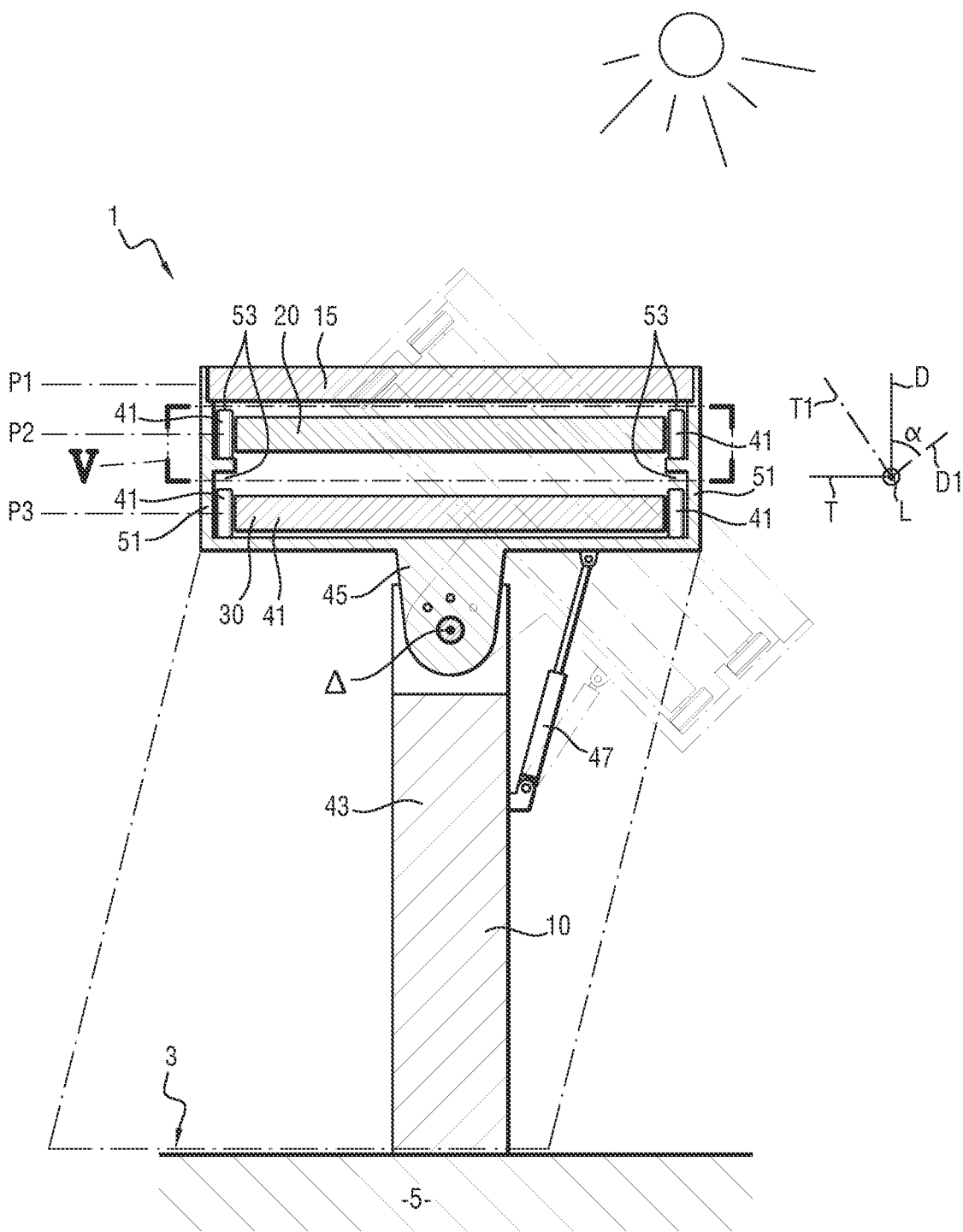
FIG. 2 is a schematic profile view of the shade house shown in FIG. 1 in a longitudinal direction of the shade house.
Figure 3:
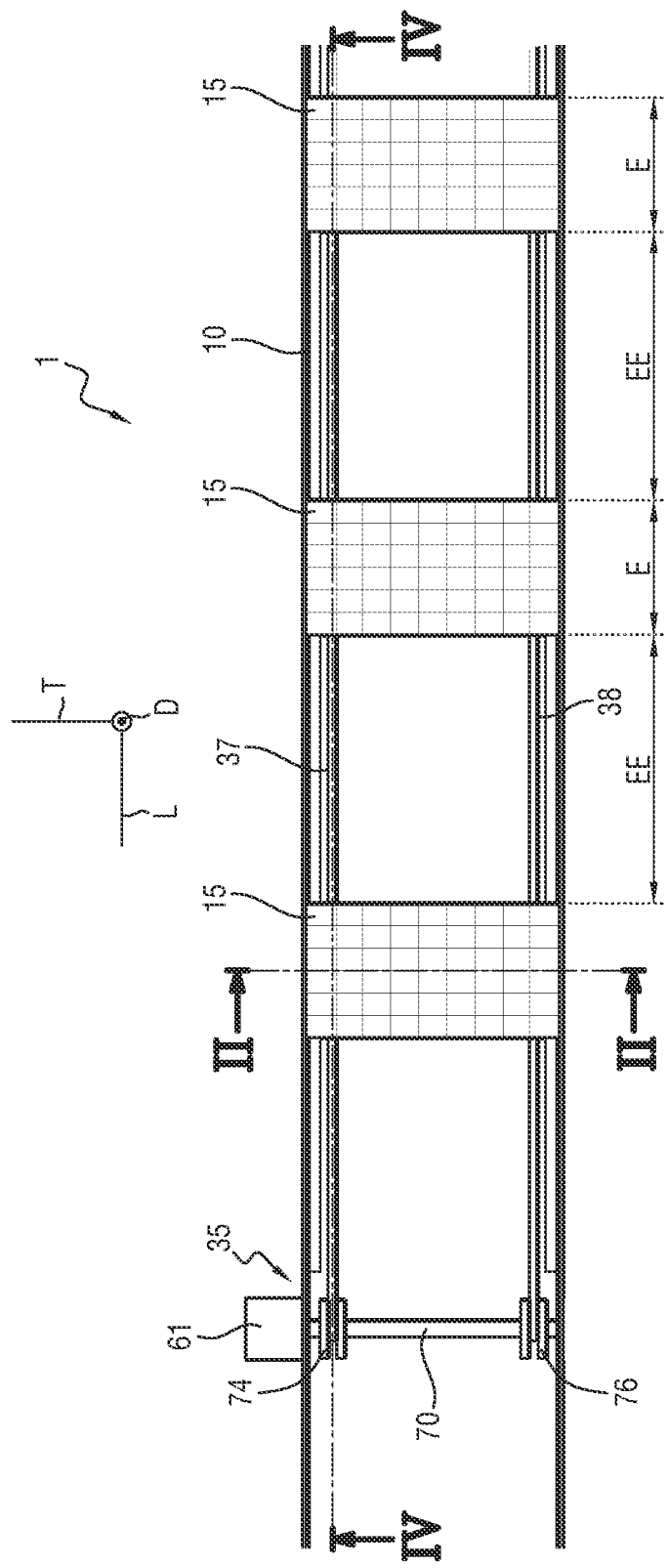
FIG. 3 is a schematic top view of the shade house shown in FIGS. 1 and 2, with the shade house in an open configuration.
Figure 4:
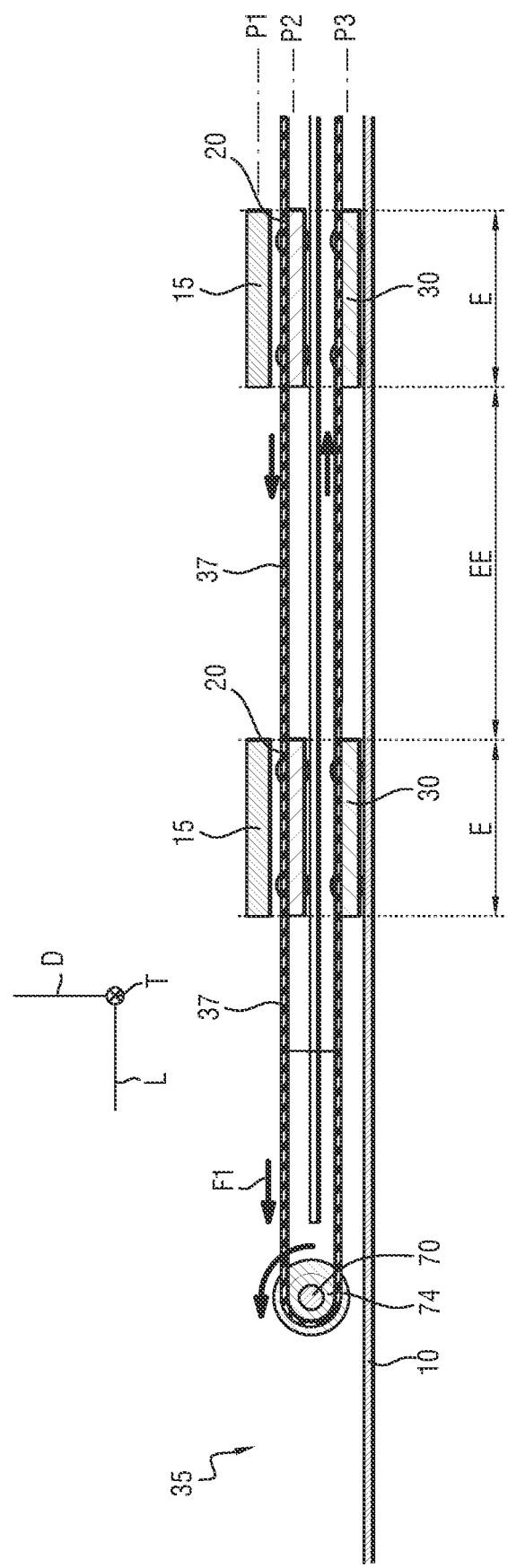
FIG. 4 is a schematic cross-sectional view in a vertical longitudinal plane of the shade house shown in FIGS. 1 to 3.

The shade house 1 further comprises an actuation system 35 configured to actuate the second and third sets, at least from an open configuration of the shade house, shown in FIGS. 2 to 4, to a closed configuration, shown in FIG. 1.

Note that the differences between the first set, the second set and the third set along the axis D have been exaggerated in the figures to better distinguish between these sets.

The panels 15 of the first set are fixed in relative to each other and distributed successively along the longitudinal direction L. In the example shown, the panels 15 are fixed on frame 10. The panels 15 extend, for example, in the same plane P1 (FIG. 4) substantially perpendicular to the orientation axis D. In other words, all the panels 15 of the first set are at the same level in projection on the orientation axis D.

According to a variant not shown, the panels 20 of the second set and the panels 30 of the third set are not photovoltaic, but simply opaque. "Opaque" means, for example, that the panels are adapted to reduce the radiation flux received on the ground directly from the sun by at least 80%.

The panels 20 are fixed to each other, for example by means of two cables 37, 38 of the actuation system 35 (FIG. 4) and are distributed successively longitudinally. The panels 20 are mounted on frame 10 substantially orthogonal to the orientation axis D. The second set is movable in longitudinal translation with respect to frame 10 between the open configuration (FIGS. 2 and 3), in which the panels 20 are totally superposed on the panels 15 of the first set when viewed along the orientation axis D, and the closed configuration (FIG. 1), in which the panels 20 are totally superposed on the panels 15 when viewed along the orientation axis D.

In the example shown, panels 15, 20, 30 are structurally identical to each other, so that full overlapping is possible in the open configuration. In the open configuration, panels 15 and 20 are not completely overlapped in the open configuration, according to variants not shown.

According to other variants, not shown, in the closed configuration, panels 15 and 20 are not adjacent in view along the orientation axis D as shown in FIG. 1 but are partially superposed. In any case, the overlap is less in the open configuration than in the closed configuration, so that a greater shadow 3 is obtained in the closed configuration than in the open configuration.

The panels 20 of the second set extend in a plane P2 substantially parallel to plane P1, and for example located below plane P1 along the orientation axis D.

The panels 30 of the third set are fixed to each other, for example by cables 37, 38, and are distributed successively in the longitudinal direction L. The panels 30 are mounted on frame 10 substantially orthogonally to the orientation axis D. As with the second set, the third set is longitudinally movable relative to frame 10 between the open configuration, wherein the panels 30 are superposed with the panels 15 in view along the orientation axis D, and the closed configuration, wherein the panels 30 protrude completely beyond the panels 15.

According to a variant not shown, the panels 30 are fixed to each other by cables other than the cables 37, 38, which are independent of the latter.

The panels 30 of the third set extend in a plane P3 parallel to planes P1 and P2 and located, for example, below plane P2 along the orientation axis D.

Advantageously, the panels 15, 20, 30 have the same extension E in the longitudinal direction L. Similarly, advantageously, the panels 15, 20, 30 are evenly distributed in the longitudinal direction L and two successive panels 15, 20, 30 respectively of the first set, the second set or the third set are separated longitudinally by the same gap EE.

According to a variant not shown, the cables 37, 38 are replaced, between panels 20, 30, by rods (not shown) adapted to secure the panels 20, 30 to each other.

In the example shown, the gap EE is twice the extension E. Thus, in the closed configuration shown in FIG. 1, the panels 15, 20, 30 are longitudinally adjacent.

For example, the panels 15, 20, 30 are between 25 mm and 50 mm thick.

For example, planes P1, P2, and P3 when the third set is present, are separated by a distance of 100 mm maximum.

Figure 5:
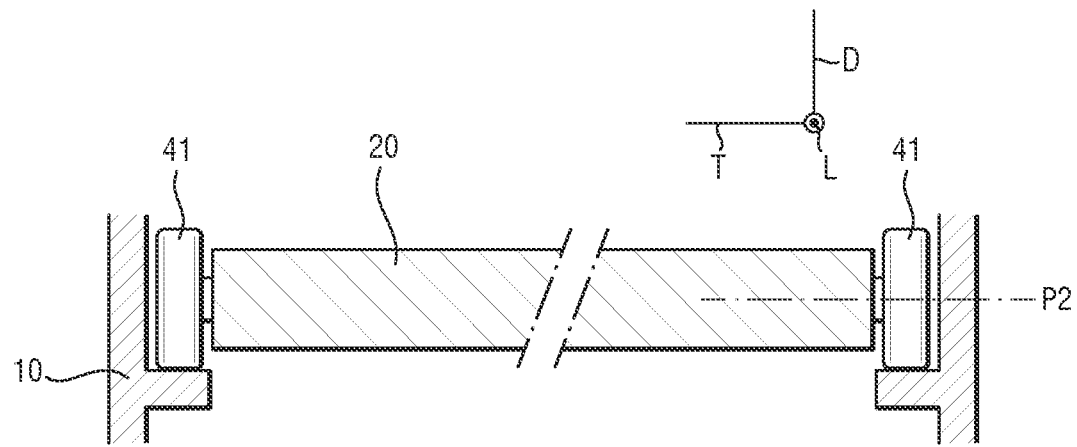
FIG. 5 is a schematic cross-sectional view in a vertical transverse plane of a moving panel of the shade house shown in FIGS. 1 to 3.

The panels 20, 30 advantageously comprise rollers 41 (FIGS. 4 and 5).

According to a particular embodiment, the shade house 1 does not include the third set of panels. In this case, the distance EE between two successive panels 15 or between two successive panels 20 is advantageously equal to the extension E, and not twice the extension E.

In general, the shade house 1 may comprise two, three, four, or more sets of panels as described above.

According to a particular case (not shown), the panels 15 of the first set are movable in translation with respect to frame 10. They are, for example, manually operated.

For example, frame 10 comprises supports 43 forming posts, and a movable part 45 that can be rotated relative to support 43 about a pivot axis Δ substantially parallel to the longitudinal direction L.

The supports 43 are, for example, evenly spaced longitudinally and are advantageously vertical.

For example, the movable part 45 can be moved between a first position, shown in solid lines in FIG. 2, in which the orientation axis D is advantageously substantially vertical, and a second position, shown in mixed lines, in which the orientation axis D occupies a position D1 at an angle α to the vertical. The angle α is for example between 0 and 60 degrees.

The first position, with little or no inclination, is called the "summer" position.

The second position, more inclined, is called "winter" because it is adapted to a sun lower, relative to the horizon.

Advantageously, the mobile part 45 can be moved by means of an actuator 47 between a plurality of positions (two of which are shown).

Figure 6:
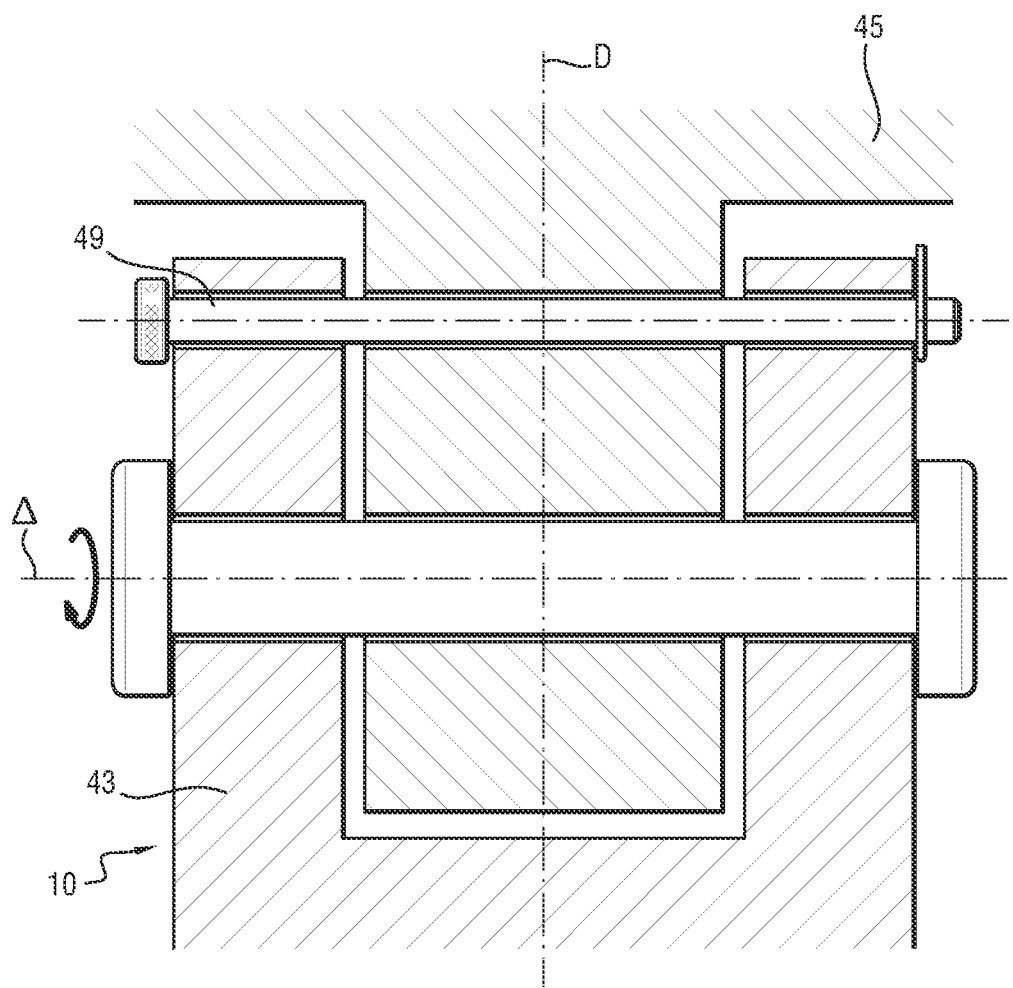
FIG. 6 is a schematic cross-sectional view of a hinge of the shade house shown in FIGS. 1 to 3.

Alternatively, the movable part 45 is moved manually, or by means of a mechanical system, and locked by means of a key 49 (FIG. 6) in at least two positions relative to the supports 43.

The movable part 45 defines a frame within which panels 20 and 30 are configured to move. For example, the movable part 45 comprises two stringers 51 parallel to the longitudinal direction L, and opposite each other in a transverse direction T perpendicular to the longitudinal direction L and the orientation axis D.

The angular position of the orientation axis D defines the position of the movable part 45 and the angular orientation of the panels 15, 20 30 around the pivot axis Δ.

The two stringers 51 support the panels 15, 20, 30, which extend transversely from one stringer to the other.

Advantageously, the stringers 51 define the grooves 53 adapted to receive the panels 20, 30.

In the example shown, the rollers 41 of panels 20, 30 are configured to roll in the grooves 53.

Optionally, the panels 20, 30, not shown, have no rollers and slide in the grooves 53.

In addition to the cables 37, 38, the drive system 35 includes two transverse shafts 70, 72 rotatably mounted on frame 10, four pulleys 74, 76, 78, 80, and a drive motor 61 (FIGS. 1, 3 and 4).

The shafts 70, 72 are, for example, located substantially at the longitudinal ends of the frame 10.

The pulleys 74, 76 are fixed on shaft 70, advantageously on its transverse ends, and are configured to drive respectively cables 37, 38.

The pulleys 78, 80 are fixed on shaft 72, advantageously on its transverse ends, and are idler pulleys for the cables 37, 38, respectively.

The cable 37 forms a closed loop stretched between the pulleys 74 and 80. The cable 37 is attached to each of the panels 20, 30, for example on their upper sides. Advantageously, an upper half of the cable 37 is fixed to the panels 20 of the second set, while a lower half is fixed to the panels 30 of the third set.

The cable 38 also forms a closed loop stretched between the pulleys 76 and 78. The cable 38 is attached to each of the panels 20, 30, for example on their upper sides. Advantageously, an upper half of the cable 38 is fixed to the panels 20 of the second set, while a lower half is fixed to the panels 30 of the third set.

With this configuration, the same actuation of the cables 37, 38 allows the panels 20 and 30 to move longitudinally in opposite directions.

According to a variant not shown, the panels 20 and 30 are actuated by separate cables, respectively. In other words, each set of panels has its own drive cables.

In still other variants (not shown), the panel sets are driven by a single cable, for example located transversely, substantially in the middle of frame 10, or are driven by more than two cables, whether or not they are common to the panel sets.

As will be understood, the frame 10 has a length in the longitudinal direction L which is adapted to the ground 5 to be covered. Typically, the length of the frame 10 varies from a few meters to a few tens or even hundreds of meters.

According to particular embodiments (not shown), the shade house 1 can comprise several frames similar to frame 10, and aligned according to the longitudinal direction L and/or the transverse direction T so as to cover a predetermined surface of the ground 5. For example, the shade house 1 may comprise several frames similar to frame 10 and juxtaposed with each other, each frame comprising panel sets and drive systems similar to those described above.

The shade house 1 also comprises electrical circuits, not shown and known per se, to collect the electricity generated by the panels 15, 20, 30.

The operation of the shade house 1 will now be described.

Depending on the season or other criteria, the inclination of the movable part 45 is chosen. To do this, the actuator 47 is actuated to put the movable part 45 in the desired position relative to the supports 43, for example the first position or the second position shown in FIG. 2.

In the embodiment where the choice of the inclination is made manually, the key 49 allows the movable part 45 to be blocked in the chosen position relative to the supports 43.

To switch from the open configuration, shown in FIGS. 3 and 4, to the closed configuration, shown in FIG. 1, the motor 61 drives the shaft 70 and the pulleys 74, 76 in rotation relative to frame 10. This moves the cables 37, 38 according to the arrow F1 (FIG. 4).

Thus, the panels 20 of the second set are moved longitudinally to the left of FIG. 4, while the panels 30 of the third set are moved to the right of FIG. 4. As a result, the panels 20 and 30, which were located perfectly below the panels 15 of the first set, move respectively to the left and to the right of the panels 15 they were closest to, to reach the closed configuration shown in FIG. 1, in which shadow 3 is maximum.

In the example shown, the pulleys 78, 80 are used to tension and return the cables 37, 38.

Thanks to the features described above, the shade house 1 is simpler than those of the earlier designs, and the shadow 3 is adjustable over a wide range of settings thanks to the movements of the panels 20, 30, and advantageously of the movable part 35.

Advantageously also, thanks to the shaft 70, the pulleys 74, 76 driving the cables 37, 38, it is possible to obtain a displacement of the second set and the third set with the help of the single motor 61.

The shade house 1 allows a modularity of the shade rate over a very wide range. In the folded and vertical position, it allows rainwater to irrigate the crops. The possibility to tilt the movable part 45 allows, in case of strong storm, to reduce the wind pressure. In the extended position, the movable part 45 offers crop protection against hail.

The invention claimed is:
1. A shade house (1) adapted to form an adjustable shadow (3) on a ground surface (5), the shade house (1) comprising:
   at least one frame (10) extending in a longitudinal direction (L) substantially parallel to the ground surface (5),
   a first set of photovoltaic panels (15) mounted on the frame (10) substantially orthogonal to a same orientation axis (D), fixed relative to each other, and distributed successively along the longitudinal direction (L),
   a second set of opaque panels (20), mounted on the frame (10) substantially orthogonal to the orientation axis (D), fixed to each other, and distributed successively in the longitudinal direction (L), the second set being movable in translation longitudinally relative to the frame at least between an open configuration of the shade house (1), wherein the panels (20) of the second set are at least partially superposed on the panels (15) of the first set when viewed along the orientation axis (D), and a closed configuration of the shade house (1), wherein the panels (20) of the second set protrude at least partially beyond the panels (15) of the first set when viewed along the orientation axis (D),
   a third set of opaque panels (30) mounted on the frame (10) substantially orthogonal to the orientation axis (D), fixed to each other, and distributed successively in the longitudinal direction (L), the third set being movable in translation longitudinally relative to the frame (10) at least between the open configuration, wherein the panels (30) of the third set are at least partially superposed on the panels (15) of the first set when viewed along the orientation axis (D), and the closed configuration, wherein the panels (30) of the third set protrude at least partially from the panels (15) of the first set and the panels (20) of the second set when viewed along the orientation axis (D), and
   an actuation system (35) configured to actuate the second set, at least from the open configuration to the closed configuration, and vice versa, the actuation system comprising a plurality of pulleys (74, 76, 78, 80) mounted on the frame (10) wherein the frame comprises at least one support extending perpendicularly to the ground surface.

2. The shade house (1) according to claim 1, wherein:
   the panels (20) of the second set are fixed to each other by at least two cables (37, 38), and
   the panels (30) of the third set are fixed to each other by at least two cables (37, 38).

3. The shade house (1) according to claim 2, wherein each of the two cables (37, 38) respectively form a closed loop, each of the loops being stretched between two of the pulleys (74, 76, 78, 80) respectively.

4. The shade house (1) according to claim 1, wherein the actuating system (35) further comprises:
   at least one shaft (70) rotatable and mounted on the frame (10), and
   at least one motor (61) configured to drive the shaft (70), two of the pulleys (74, 76, 78, 80) being fixed to the shaft (70).

5. The shade house (1) according to claim 1, wherein the panels (15, 20, 30) have a same extension (E) in the longitudinal direction (L).

6. The shade house (1) according to claim 5, wherein:
   the panels (15) of the first set are evenly distributed along the longitudinal direction (L), two successive panels (15) of the first set being separated longitudinally by a same gap (EE),
   the panels (20) of the second set are evenly distributed along the longitudinal direction (L), two successive panels (20) of the second set being separated longitudinally by said gap (EE),
   the panels (30) of the third set are evenly distributed along the longitudinal direction (L), two successive panels (30) of the third set being separated longitudinally by said gap (EE),
   said gap (EE) being substantially equal to twice said extension (E).

7. The shade house (1) according to claim 1, wherein:
   the frame (10) comprises two stringers (51) opposed in a transverse direction (T) perpendicular to the longitudinal direction (L), and
   the panels (20) of the second set and the panels (30) of the third set extend transversely between the stringers (51) and are supported by the stringers (51).

8. The shade house (1) according to claim 7, wherein:
   the stringers (51) define grooves (53) for guiding the panels (20, 30), and
   the panels (20) of the second set and the panels (30) of the third set have rollers (41) adapted to roll in said grooves (53).

9. The shade house (1) according to claim 7, wherein the frame (10) comprises one movable part (45) including the two stringers (51), the movable part (45) being rotatable relative to the support (43) about a pivot axis (A) substantially parallel to the longitudinal direction (L) between at least two distinct positions.

10. A method for forming and adjusting a shadow on a surface, comprising the following steps:
    providing a shade house (1) according to claim 1,
    actuation of the second set to move the second set longitudinally in translation relative to the frame (10) at least between the open configuration of the shade house (1) and the closed configuration, or vice versa,
    actuation of the third set to move the third set longitudinally relative to the frame (10) at least between the open configuration of the shade house (1) and the closed configuration, or vice versa, and
    production of electricity by at least some of the panels (15, 20, 30), and recovery of the electricity produced.

11. A shade house (1) adapted to form an adjustable shadow (3) on a ground surface (5), the shade house (1) comprising:
    at least one frame (10) extending in a longitudinal direction (L) substantially parallel to the ground surface (5),
    a first set of photovoltaic panels (15) mounted on the frame (10) substantially orthogonal to a same orientation axis (D), fixed relative to each other, and distributed successively along the longitudinal direction (L),
    a second set of opaque panels (20), mounted on the frame (10) substantially orthogonal to the shaft orientation axis (D), fixed to each other, and distributed successively in the longitudinal direction (L), the second set being movable in translation longitudinally relative to the frame at least between an open configuration of the shade house (1), wherein the panels (20) of the second set are at least partially superposed on the panels (15) of the first set when viewed along the orientation axis (D), and a closed configuration of the shade house (1), wherein the panels (20) of the second set protrude at least partially beyond the panels (15) of the first set when viewed along the orientation axis (D), and an actuation system (35) configured to actuate the second set, at least from the open configuration to the closed configuration, and vice versa, the actuation system comprising a plurality of pulleys (74, 76, 78, 80) mounted on the frame (10) wherein the frame comprises at least one support extending perpendicularly to the ground surface.

12. The shade house (1) according to claim 11, wherein: the panels (20) of the second set are fixed to each other by at least two cables (37, 38).

13. The shade house (1) according to claim 11, wherein the panels (15, 20, 30) have a same extension (E) in the longitudinal direction (L), the panels (15) of the first set are evenly distributed along the longitudinal direction (L), two successive panels (15) of the first set being separated longitudinally by a same gap (EE), the panels (20) of the second set are evenly distributed along the longitudinal direction (L), two successive panels (20) of the second set being separated longitudinally by said gap (EE), said gap (EE) being substantially equal to said extension (E).

14. The shade house (1) according to claim 11, wherein:

the frame (10) comprises two stringers (51) opposed in a transverse direction (T) perpendicular to the longitudinal direction (L), and the panels (20) of the second set extend transversely between the stringers (51) and are supported by the stringers (51).

15. The shade house (1) according to claim 14, wherein:

the stringers (51) define grooves (53) for guiding the panels (20, 30), and the panels (20) of the second set have rollers (41) adapted to roll in said grooves (53).

16. A method for forming and adjusting a shadow on a surface, comprising the following steps:

providing a shade house (1) according to claim 11, actuation of the second set to move the second set longitudinally in translation relative to the frame (10) at least between the open configuration of the shade house (1) and the closed configuration, or vice versa, and production of electricity by at least some of the panels (15, 20, 30), and recovery of the electricity produced.

17. The shade house (1) according to claim 2, wherein the actuating system (35) further comprises:

at least one shaft (70) rotatable and mounted on the frame (10), and at least one motor (61) configured to drive the shaft (70), two of the pulleys (74, 76, 78, 80) being fixed to the shaft (70).

18. The shade house (1) according to claim 3, wherein the actuating system (35) further comprises:

at least one shaft (70) rotatable and mounted on the frame (10), and at least one motor (61) configured to drive the shaft (70), two of the pulleys (74, 76, 78, 80) being fixed to the shaft (70).

19. The shade house (1) according to claim 2, wherein the panels (15, 20, 30) have a same extension (E) in the longitudinal direction (L).

20. The shade house (1) according to claim 3, wherein the panels (15, 20, 30) have a same extension (E) in the longitudinal direction (L).

* * * * *